United States Patent
Chan-Hon-Tong et al.

(10) Patent No.: US 10,296,781 B2
(45) Date of Patent: May 21, 2019

(54) METHOD AND SYSTEM FOR DETECTING EVENTS OF A KNOWN NATURE

(71) Applicant: COMMISSARIAT A L'ENERGIE ATOMIQUE ET AUX ENERGIES ALTERNATIVES, Paris (FR)

(72) Inventors: Adrien Chan-Hon-Tong, Bourg-la-Reine (FR); Laurent Lucat, Le Mans (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 23 days.

(21) Appl. No.: 15/514,384

(22) PCT Filed: Sep. 24, 2015

(86) PCT No.: PCT/EP2015/072023
§ 371 (c)(1),
(2) Date: Mar. 24, 2017

(87) PCT Pub. No.: WO2016/046336
PCT Pub. Date: Mar. 31, 2016

(65) Prior Publication Data
US 2017/0293798 A1   Oct. 12, 2017

(30) Foreign Application Priority Data
Sep. 26, 2014  (FR) ...................................... 14 59143

(51) Int. Cl.
G06K 9/00 (2006.01)
(52) U.S. Cl.
CPC ..... G06K 9/00201 (2013.01); G06K 9/00302 (2013.01); G06K 9/00711 (2013.01);
(Continued)

(58) Field of Classification Search
None
See application file for complete search history.

(56) References Cited

U.S. PATENT DOCUMENTS

| 5,430,810 A | 7/1995 | Saeki | |
|---|---|---|---|
| 2009/0207278 A1* | 8/2009 | Muraki | H04N 5/235 348/231.99 |

(Continued)

OTHER PUBLICATIONS

Angela Yao et al., "A Hough Transform-Based Voting Framework for Action Recognition," 2010 IEEE Conference on Computer vision and Pattern Recognition, Jun. 13-18, 2010, pp. 2061-2068, XP031725713.

(Continued)

*Primary Examiner* — Stephen P Coleman
(74) *Attorney, Agent, or Firm* — Baker & Hostetler LLP

(57) ABSTRACT

A method for detecting events in a signal received on a detection sensor linked to a processor comprises: given events of nature $\{E_e\}_{e=1 \ldots Ne}$, a domain of votes D composed of I sub-domains $D_i = \{[d_i, d_{i+1}[\}$ with $i=1 \ldots I$ and a dictionary of micro-events $\{m_j\}_{j=1 \ldots M}$, initialize to an identical value an array S containing values of scores, S[e][p], where p is a spatial or temporal position index ($p \in D$), detect micro-events $m_n$ ($n=1 \ldots N$), located at $t_n$ ($n=1 \ldots N$), corresponding to a quantization of a local observation $O_n$ in the signal, for each micro-event $m_n$ located at $t_n$, for each type of event "e", for each sub-domain $D_i$ update the array $S[e][t_n+p]$ by adding a constant value for all locations $p \in D_i$, determine a set of events associated with an observation in the signal on the basis of array S, and detect the most probable event.

10 Claims, 2 Drawing Sheets

(52) U.S. Cl.
CPC ..... *G06K 9/00221* (2013.01); *G06K 9/00335* (2013.01); *G06K 9/00362* (2013.01)

(56) References Cited

U.S. PATENT DOCUMENTS

| | | |
|---|---|---|
| 2011/0235859 A1 | 9/2011 | Imoto |
| 2013/0125074 A1* | 5/2013 | Mansouri ............ G06F 17/5022 716/111 |
| 2013/0128045 A1 | 5/2013 | Habbu et al. |
| 2013/0259390 A1 | 10/2013 | Dunlop et al. |

OTHER PUBLICATIONS

Adrien Chan-Hong-Tong et al., "Simultaneous segmentation and classification for human actions in video streams using deeply optimized Hough transform," Pattern Recognition, vol. 47, No. 12, May 27, 2014, pp. 3807-3818, XP029054130.

Hiroshi Konno et al., "Best piecewise constant approximation of a function of single variable," Operations Research Letters, vol. 7, No. 4, Aug. 1988, pp. 205-210.

* cited by examiner

METHOD AND SYSTEM FOR DETECTING EVENTS OF A KNOWN NATURE

CROSS-REFERENCE TO RELATED APPLICATIONS

This application is a National Stage of International patent application PCT/EP2015/072023, filed on Sep. 24, 2015, which claims priority to foreign French patent application No. FR 1459143, filed on Sep. 26, 2014, the disclosures of which are incorporated by reference in their entirety.

FIELD OF THE INVENTION

The invention relates to a method and a system for the detection of events. It is used for the detection of events of a known nature in signals, for example data streams, real-time or recorded. It applies, for example, in the detection of a person's activity of a cataloged nature, actions in the everyday life of a person of interest, the detection of the emotions of a cataloged nature of a person of interest, the presence of an object of a known nature in a scene, a sound event of a known nature, by analysis of a signal typically a video. It also applies in respect of events of a known nature of seismography/geological type.

The field of the detection and recognition of events such as human activity has become a significant avenue of research. The possibility of detecting human activities may lead to the development of applications in various fields, for example video-based medical protection, etc.

BACKGROUND

The systems known from the prior art involve the detection of micro-events which are characteristic of one or more different events, and the weighted accumulation over time or in space of these micro-events preferentially unveils one event, then another and so on and so forth. The detection of a micro-event generates weighted votes for each of the events, at each temporal/spatial location. In existing systems, the vote of a micro-event follows an arbitrary distribution exhibiting a different weight in the time/space domain. This therefore requires a significant quantity of memory and of operations. FIG. 1 is a basic diagram of a detection method according to the prior art. For each observation $O_i$, a vote value or confidence value $V_{iO}$, 11, which will serve to determine the associated event, 13 at $t_0$, is associated with a given instant $t_0$, 10. The generic approach to detection known from the prior art requires a memory of fairly significant size. Assuming that each of the values of the function representative of the score v is stored on a double, that is to say on 8 bytes, then, according to the generic method of the prior art, the quantity required to store v is the product of eight and the number of interesting event types (Ne), the number of detectable micro-events (M), the temporal domain of the votes, that is to say Ne*M*(2d+1), where d is the half-size of the temporal domain over which the observation is looked at. Moreover, the propagation of the information requires Ne*(2d+1) operations of addition and of reading of "doubles", the reading of an array v[Ne][$m_n$][$d_{obs}$] where $d_{obs}$ corresponds to an instant of observation and of addition to an event table S[e][$t_n$+$d_{obs}$] per micro-event. For example, if Ne=30, (there are 30 different possible events), M=1000 micro-events, d=100, (equivalent of 5 seconds at 25 images per second), the memory required for the generic detector is 60 Mbytes and the number of reading operations equal to 15 000. In the case of procedures which use more micro-events, the storage memory must be able to store the equivalent of 1 Gbyte of votes, which in general is hardly compatible with a standard microcontroller. One of the known approaches for decreasing the memory and the calculations required is to compress the array v, v[Ne][M][d], for example, by the procedure described in the document entitled "best piecewise constant approximation of a function of single variable" by Hiroshi Konno et al, Operations Research Letters, volume 7, number 4, August 1988. This approach leads to a blind modification of the votes. Indeed, the votes are intermediaries between the micro-events and the segmentation. Modifying the votes without taking account of the effect on the segmentation amounts to making modifications blindly and may lead to a significant increase in the error even for weak modifications.

The document entitled "A Hough Transform-Based Voting Framework for Action Recognition" by Angela Yao et al, Conference Computer vision and Pattern Recognition, Jun. 13-18, 2010, IEEE, pages 2061-2068 describes a procedure for classifying actions or observations contained in a video sequence.

The document entitled "Simultaneous segmentation and classification for human actions in video streams using deeply optimized Hough transform" by Adrien Chan-Hong-Tong published in 2014 describes a procedure for detecting actions taking into account the temporal location of the actions.

Documents US 20130128045 and U.S. Pat. No. 5,430,810 describe procedures for line detection in images and pertain to the optimized management of the intermediate results.

The procedures described in the prior art which are known to the applicant require a fairly significant memory to process the data.

One of the objectives of the present invention is to offer a method and a system making it possible to reduce the memory size required to store the set of votes, and to reduce the number of processing operations without undermining the performance level of the detector (that is to say while remaining compatible with the effective presumed wisdom of the literature).

SUMMARY OF THE INVENTION

In the subsequent description, the term "event" is defined as a particular pattern contained in a signal, and the term "micro-event" as a fraction of the event, several micro-events constituting the event. A micro-event depends on the size of the event. The method according to the invention will search for the presence of a micro-event in a signal. Associated with the word "vote" is an elementary confidence that a micro-event is associated with a localized event and associated with the word "score" of an event is a value of confidence or probability that the event corresponds to the observation performed on a signal. The score of the event E is the sum of all the votes of the micro-events in favor of this event E. A range in which a micro-event or an event is possible will be defined by the expression "voting domain" or "voting expanse".

The idea of the present invention is notably to improve the systems for detecting events by considering time intervals for which a constant score value is allocated.

The invention relates to a method for detecting one or more events associated with a signal received on a detection sensor linked to a processor, the method comprising at least the following steps:

Given events of a known nature $\{E_e\}_{e=1 \ldots Ne}$, a domain of votes D composed of I sub-domains $Di=[d_i, d_{i+1}[$ with $i=1 \ldots I$ and a dictionary of micro-events $\{m_i\}_{i=1 \ldots M}$, Initialize to an identical value an array S containing values of scores S[e][p] corresponding to an event "e" located at p, where p is an index designating a temporal or spatial position with $p \in D$, Detect one or more micro-events $m_n$ (n=1 ... N) located at $t_n$ (n=1 ... N) corresponding to a quantization of an observation $O_n$ of the signal, For each micro-event $m_n$, located at $t_n$, for each type of event "e" for each sub-domain $D_i$, update the array S[e][$t_n$+p] by adding a constant value for all the locations p with $p \in [d_i, d_{i+1}[$, Determine a probable set of events associated with an observation of the signal on the basis of the array S, and detect within the signal the most probable event associated with an observation.

The locations $t_1, \ldots t_N$ are, for example, temporal instants.

According to a variant embodiment, the values of instants of detection of the micro-events are chosen as multiples of a given value "increment".

According to another variant embodiment, the signal is processed continuously.

The invention also relates to a system for detecting events associated with a signal comprising at least the following elements:
- a sensor adapted for detecting one or more micro-events $m_n$ in the signal, at given instants $t_1, \ldots t_N$, corresponding to an observation Oi,
- a memory for storing the results,
- a processor adapted for executing the steps of the method according to the invention.

The system can comprise a buffer memory for storing the signal arriving continuously.

BRIEF DESCRIPTION OF THE DRAWINGS

Other characteristics and advantages of the present invention will become better apparent on reading the description which follows of exemplary embodiments given by way of wholly nonlimiting illustration, accompanied by the figures which represent.

DETAILED DESCRIPTION

The detailed example which will follow is given by way of illustration for the detection of an action of a person on the basis of data contained in a video stream of given size, an image for example, arriving continuously at a detection sensor for example. The action of a person covers any type of event whose nature is cataloged in a database during the design of the system. The description which follows can be implemented, without departing from the scope of the invention and optionally with a few adaptations, to any type of events cataloged during a prior learning phase, for example. In a more generic manner, the method applies to a signal in which it is desired to detect predefined patterns.

Each video is seen as a succession of images/of instants. To each instant there corresponds an image and vice versa. The method according to the invention calls upon statistical learning. During this learning, each image of each video is provided with an annotation indicating which event is the one associated with the image. This annotation is given, for example, by an expert who can use the entirety of the information contained in the video. The learning consists notably in parametrizing the detector in such a way that it consistently produces outputs often equivalent to the pre-established data. During the design of the system, one or more types or one or more categories of events will be specified, and the implementation of the method will lead to the detection of the presence of an event, by searching for the occurrences of these events in the captured signal. The signal exhibits analogies with the types of events, for example for a type of event declared "car", the image signal can contain a part of the deformed car.

The method and the system for its implementation will seek to detect at each image of the video which event or events seem to fit best with an observation.

Figure 1:
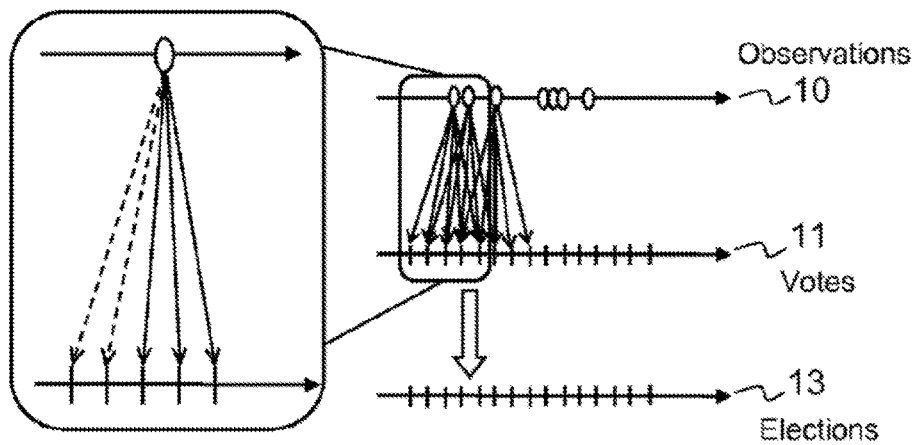
FIG. 1, a diagram of the method according to the prior art.
Figure 2:
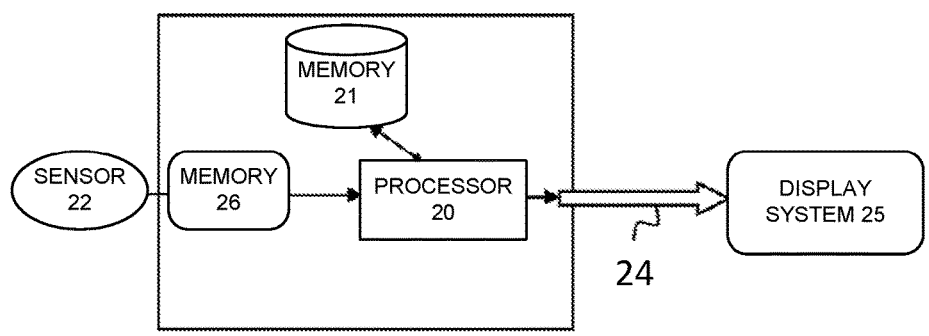
FIG. 2, the principle implemented by the method according to the invention.

FIG. 2 represents an exemplary architecture of a system allowing the implementation of the steps of the method according to the invention. The system comprises a processor 20, a memory 21 adapted for storing both the software and the vote values obtained by executing the method and which will be read to determine the probable event. This memory can also contain data defined during the learning period. The system also comprises a sensor 22 for detecting the signal (for example a data stream) or the video linked to the processor 20, an output 24 linked for example to a display system 25 representing the event retained and associated with an observation. The system can also comprise a memory or "Buffer" 26 for storing the stream to be analyzed when the signal is analyzed continuously, without interruption.

During the learning phase, a dictionary of possible micro-events $\{m_i\}_{i=1 \ldots M}$ of size M and a number $N_e$ of type (nature) of possible events $\{E_e\}_{e=1 \ldots Ne}$ will have been fixed.

Figure 3:
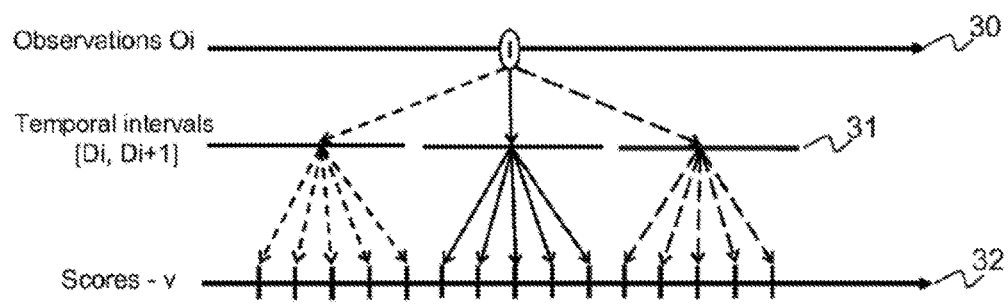
FIG. 3, an exemplary detector architecture according to the invention.

According to a first embodiment illustrated in FIG. 3, the method and its system will update the score for each event. Accordingly, the method extracts a set of micro-events located in the video. Each micro-event increases by a certain quantity the score of each event (that is to say "vote" for each event) in a temporal neighborhood of its extraction image. Once all the neighbor micro-events of an instant have increased the scores of the possible events of this instant, a set of relevant events is selected to characterize the present and past observation. For example, the events whose score exceeds a threshold value are retained, or else the Q events having the Q best scores (singularly the best if Q=1). The type or category of events is specified during the design of the system. A set of Types of events is determined. The analyzed signal exhibits locally analogies with the types of events, for example, for a type of event declared "car", the image signal will be able to contain for example a half of the deformed car, which will be associated with the "car" event type.

To simplify the notation, the case of one-dimensional sub-domains is described, it being understood that the procedure explained extends directly to the case of multidimensional sub-domains such as two-dimensional zones in an image, where the bounds of the sub-domain are then a multiple of an increment potentially defined for each dimension.

The data and parameters used for the implementation of the method illustrated in FIG. 3 are given hereinafter:

$m_1, \ldots, m_N$, a micro event, with N micro events detected at the instants $t_1, \ldots, t_N$, T the size of the video, Ne the number of type of events searched for, D is the temporal domain of the votes, composed of I sub-domains $D_i = \{[d_i, d_{i+1}[\}$, with $i=1 \ldots I$, $-d=d_1 <d_2< \ldots <d_I=d$ a decomposition of the temporal domain into I sub-domains, d corresponds to an instant of a sub-domain $D_i$, "Detection" is the set of predictions returned (one per image).

The method can comprise the following steps:

Given possible events $\{E_e\}_{e=1 \ldots Ne}$, of a known nature, the domain of votes $D_{i=1 \ldots I}$ and a dictionary of M micro-events $\{m_i\}_{i=1 \ldots M}$, we shall:

Initialize to an identical value, typically equal to zero, an array S of size T times E: $S[e][p=t]=K$ (K is typically equal to zero); the array S contains the values of the variables of scores e corresponding to an event, where p=t corresponds to an observation instant given in this example, For n=1 to N, N being the number of micro-events actually detected in a signal received on the detection sensor, (for each micro-event $m_n$ located at $t_n$), 30, For e from 1 to E, (loop over each possible type of event "e"), For i from 1 to I, (for each sub-domain $D_i$), The array S is updated by adding a constant value v for all the locations p belonging to the sub-domain $D_i$, 31, $S[e][t_n+p]=S[e][t_n+p]+v[e][m_n][i]$ where $v[e][m_n][i]$ is a constant value for all the locations p=t belonging to the sub-domain $D_i$.

A set of events associated with an observation in the signal will be determined thereafter (for t=1 to T), and the event which is the most probable in the signal and which is associated with an observation will be detected for example by searching for the maximum value over e in the array S, for each value of t=p, 32:

Detection[t]=max arg over e of S[e][p], thereby making it possible to detect the most probable characteristic event associated with an observation Oi of the signal received, for example, a video.

All the score values associated with a pair {micro-event, event} are imposed and identical for the instants contained in the sub-domain $D_i$ and are stored in a single value. The number of values to be stored decreases from $E*M*(2D+1)$ according to the procedures known from the prior art to $E*M*I$. Likewise, the number of memory read operations is reduced.

The variable p designates in a generic manner a temporal variable t or a spatial variable.

Figure 4:
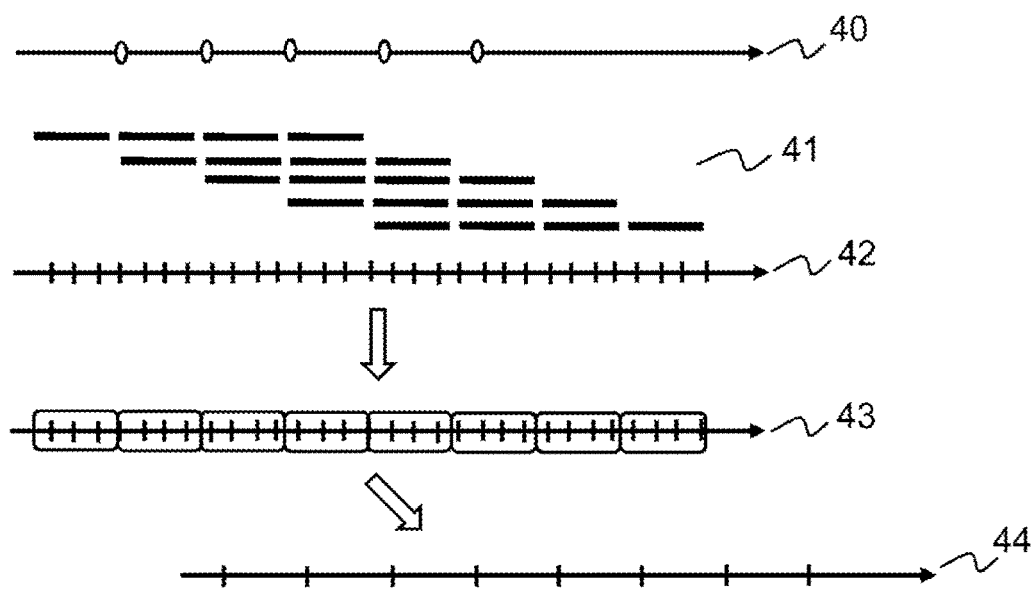
FIG. 4, an illustration of a first variant of the method.

According to another embodiment illustrated in FIG. 4, the method assumes that the instants on which the sub-domains $D_i$ are defined are a multiple of a given value "increment" better known in the technical field by the term "step".

The input parameters and data are as follows: $M_1, \ldots, m_N$, N micro events detected at the instants $t_1, \ldots, t_N$ by assuming that the value of the instants that are chosen for the observation $t_n$ is a multiple of "step", T the size of the video, E is the number of events which interest the user, D is the temporal domain of the votes, $-d=d_1<d_2< \ldots <d_I=d$ a decomposition of the temporal domain such that for all i, $d_i$ is a multiple of "step", "Detection" is the set of predictions returned (one per image).

The method "INTERVALS_STEP" then comprises the following steps:

Initialize an array S of size T/step times E: $S[e][t]=0$;

For n=1 to N, step 40,

For e from 1 to E

For i from 1 to I

For j from $d_i$ (included) to $d_{i+1}$ (excluded) per jump of step, steps 41, 42, tau=$(t_n+j)$/step, instant a multiple of step, $S[e][tau]=S[e][tau]+v[e][m_n][i]$, step 43, For t=1 to T tau=IntegerPart(t/step);

Prediction[t]=max arg over e of S[e][tau]; the event is detected for an observation, step 44.

This variant embodiment makes it possible to divide by "step" the number of additions of doubles. In the case where "step"=4, this is equivalent to a 75% reduction in the number of addition of doubles.

The method can be implemented to detect events or actions in a continuously observed video data stream. The implemented algorithm is then an infinite loop, since the video arrives in an infinite manner, and uses a command "Extract" the following micro-event to obtain the next word extracted (independent processes).

The input parameters and data of the process are as follows:

E is the number of elected or chosen events,

D is the temporal domain of the votes, $-d=d_1<d_2< \ldots <d_I=d$ a decomposition of the temporal domain, "Detection" is the set of predictions returned (one per image)

B a buffer size (typically 5*D).

The method "INTERVAL_STREAM" comprises for example the following steps:

Initialize an array S of size B times E: $S[e][t]=0$;

t=−d

Do in a loop

Extract the following micro-event m at t'

While t<t'−d

Detection[t]=max arg over e of S[e][t % B]; with t % B designating the rest of the Euclidean division of t by B, S[e][t % B]=0;

t=t+1;

For e from 1 to E

For i from 1 to I

For d from $d_i$ (included) to $d_{i+1}$ (excluded)

$S[e][t'+d]=S[e][t'+d]+v[e][m][i]$.

Without departing from the scope of the invention, the main steps of the method according to the invention apply, by adapting them if necessary, in the spatial domain by locating in space the micro-events, by defining a spatial score domain and by initializing the array S in space. Spatial rather than temporal locations will then be considered for the execution of the steps.

A few examples of signals and of events are given by way of illustration to aid to better elucidate the invention:

1—Signal=2D image.

TYPES of events: E1="car", E2="house", E3="person", E4="animal";

The technical effect is the dispatching of a message "E4 at a position (i1, j1) in the image" and "E2 detected at the position (i2, j2)";

This message can be viewed on a screen, or stored in memory.

2—Signal=3D video stream arising from a 3D camera mounted at the front of a car.

TYPES of events: E1="bike", E2="person"

The technical effect is the dispatching of a message E1 at a position (x1, y1, z1) at the instant t1 in the image and E2 at the position (x2, y2, z2) at the instant t2, and at the position (x3, y3, z3) at the instant t3;

This message can be viewed on a screen to inform the driver of presence of vulnerable items, it can be connected to a sound alarm.

3—Signal=stream of 3D coordinates of points of articulation of a human skeleton (these data originating from sensors positioned on the person, or from video processing).

TYPES of events:

E1="the person is cooking", E2="the person is eating his meal", E3="the person is moving around", E4="the person is resting";

The technical effect is the dispatching of successive messages "E4 at the time t1", "E3 at t2", "E1 at t3", "E2 at t4", "E3 at t5", . . . .

One of the advantages of the method according to the invention is that, whatever temporal or spatial sub-domain is chosen and whatever sub-domains of decompositions $(D_1, \ldots, D_j)$ are chosen, it is always possible to carry out the various learning known from the literature. During the learning phase, the method can consider all the temporal sub-domains or intervals comprising zero that are constructed over the decomposition: that is to say the set of sub-domains [di, dj[ with di<0<dj. An additional processing consisting in recombining these sub-domains then makes it possible to obtain the vote value sought on each sub-domain $[d_i, d_{i+1}[$. This recombination consists in associating with a sub-domain $[d_i, d_{i+1}[$ the sum of the variables associated with the sub-domains [di, dj[ containing it.

The different variants of implementation of the method according to the invention that were described above can be combined with one another to improve the detection of events.

In the case where an event considered is an action and an observation is the skeleton of a person, a possible system for the implementation of the method according to the invention comprises, for example, a computer hooked up to an active camera. The active camera provides a succession of depth images and the software associated with the camera extracts one or more skeletons. The processor 20 of the computer performs for example three tasks:

Extract the skeleton of a person observed image by image, and form the trajectory of each articulation, Extract from these trajectories, the positions, the speeds and the series of waist positions, whenever possible, or every image "step". Each of these pieces of information is written by a vector according to a procedure known to the person skilled in the art. Each of these vectors is thereafter associated with their closest neighbor from among a bank of vectors specific to the articulation and to the type of information (position, speed or series). Following this, each piece of information is associated with a symbol corresponding to a micro-event.

Use the extracted micro-events and the learned votes to determine the action performed by the person in the image, the event, according to one of the variants of the method according to the invention described hereinabove.

Figure 5:
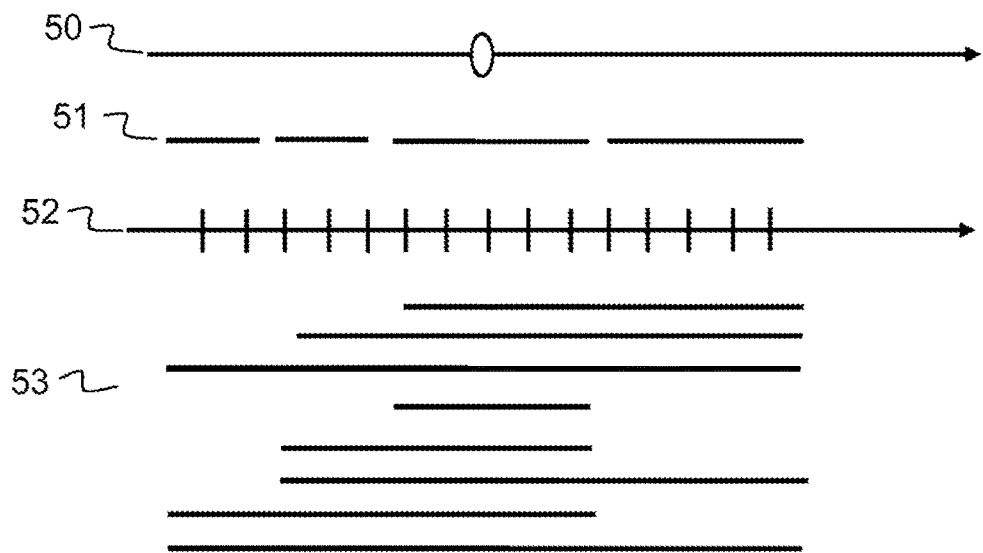
FIG. 5, an exemplary construction of temporal sub-domains.

During training, a corpus of annotated videos is used. The annotations define which actions will be searched for under test. Typically, the actions followed may be actions of everyday life: drinking, eating, reading, resting, cooking, taking medicines, etc. A domain of votes is decided as a function of the maximum number of consecutive images associated with the same action in a video. Thereafter, a number of temporal intervals is chosen for decomposing the domain of votes. The approximate DOHT (Deeply Optimized Hough Transform) learning or any other statistical learning procedure is then used. The use of these votes with the method according to the invention makes it possible to preserve a low error while using only few resources, little memory, few reads of this memory, and possibly few additions in the case of the method variant with sub-sampling. FIG. 5 illustrates this embodiment in which, for an event, 50, the desired sub-domains or intervals, 51, 52 will be chosen and approximate intervals corresponding to the set of intervals constructed over the union of the extremities containing 0 will be provided, 53, to the DOHT.

The invention applies notably to seismographic or sound signals, to 2D images or 2D videos, to 3D images or 3D videos. The signals are full signals in a matrix of dimension N, or else local signals, in particular in the case of pointlike data associated with a model (such as the skeleton of the body, a mesh on a face).

The method and the system according to the invention offer notably the advantage of decreasing the memory and calculation time required, while being compatible with a supposedly efficacious structure for optimizing the votes. The invention proposes a structure for the score value which induces a particular voting process, which reduces the number of values to be stored to E*M*I, with I much less than (2d+1), and the number of reading operations per word to only E*I. With respect to the given example of the prior art, the resource required is decreased to 3 Mbytes instead of 60 and the number of operations to 10 000 instead of 15 000. Moreover, this structure is compatible with effective selections of v. It therefore leads to informed modifications of v whose relevance is greater than those of the blind modifications of the prior art.

The invention claimed is:

1. A method for detecting events in a signal received on a detection sensor linked to a processor comprising at least the following steps:

given events of nature $\{E_e\}_{e=1 \ldots Ne}$, a domain of votes D composed of I sub-domains $D_i=\{[d_i, d_{i+1}[\}$, with i=1 . . . I and a dictionary of micro-events $\{m_j\}_{j=1 \ldots M}$, initialize to an identical value an array S containing values of scores, S[e][p] with a processor, where p is a spatial or temporal position index (p∈D), detect with the processor one or more micro-events $m_n$ (n=1 . . . N), located at $t_n$ (n=1 . . . N), corresponding to a quantization of a local observation $O_n$ in the signal, for each micro-event $m_n$ located at $t_n$, for each type of event "e", for each sub-domain $D_i$ update with the processor the array $S[e][t_n+p]$ by adding a constant value for all the locations p∈[$d_i$, $d_{i+1}$[, and determine with the processor a set of events associated with an observation of the signal on a basis of the array S, and detect with the processor the most probable event.

2. The method as claimed in claim 1, wherein the most probable event is determined by searching for a maximum argument over e of the array S[e][p] for each value of p.

3. The method as claimed in claim 1, wherein the signal takes the form of at least one of the following: seismographic signals, sound signals, and data streams, and wherein the signals comprise at least one of the following: 2D images, 2D videos, 3D images, or 3D videos.

4. The method as claimed in claim 1, wherein the locations $t_1, \ldots t_N$ are temporal instants.

5. The method as claimed in claim 4, wherein the values of instants of detection of the micro-events are chosen as multiples of a given value "increment".

6. The method as claimed in claim 4, wherein the signal is processed continuously and the method comprises at least the following steps:
 E is the number of elected or chosen events,
 D is the temporal domain of the votes which is composed of I sub-domains $D_i=\{[d_i, d_{i+1}[\}$ with $i=1 \ldots I$, $-d=d1<d2< \ldots <dI=d$ a decomposition of the temporal domain,
 initialize an array S of size B times E: S[e][t]=0;
 t=−d;
 execute the following steps as a loop:
  extract the following micro-event m at t';
  while t<t'−d;
  detection[t]=max arg over e of S[e][t % B]; with t % B designating the remainder of the Euclidean division of t by B;
  S[e][t % B]=0;
  t=t+1;
  for e from 1 to E;
  for i from 1 to I;
  for d from $d_i$ (included) to $d_{i+1}$ (excluded);
  S[e][t'+d]=S[e][t'+d]+v[e][m][i].

7. A system for detecting events in a signal comprising at least the following elements:
 a detection sensor adapted for detecting one or more micro-events $m_n$ in the signal, at given instants $t_1, \ldots, t_N$, corresponding to an observation Oi,
 a memory for storing the results,
 a processor adapted for executing the steps of the method as claimed in claim 1.

8. The detection system as claimed in claim 7, comprising a buffer memory for storing the signal arriving continuously.

9. The detection system as claimed in claim 7, wherein the signal received on the detection sensor takes the form of at least one of the following: seismographic signals or sound signals, and wherein the signals comprise at least one of the following: 2D images, 2D videos, 3D images, or 3D videos.

10. The detection system as claimed in claim 7, comprising an active camera connected to a micro-computer.

* * * * *